Dec. 25, 1934.  P. M. MILLER  1,985,351
VEHICLE WHEEL
Filed Dec. 9, 1930   2 Sheets-Sheet 1

Inventor
PHILIP M. MILLER
Richey & Watts
Attorneys

Dec. 25, 1934.　　　　P. M. MILLER　　　　1,985,351
VEHICLE WHEEL
Filed Dec. 9, 1930　　　2 Sheets-Sheet 2

Inventor
PHILIP M. MILLER
Richey & Watts
Attorneys

Patented Dec. 25, 1934

1,985,351

UNITED STATES PATENT OFFICE 1,985,351

VEHICLE WHEEL

Philip M. Miller, Cleveland, Ohio

Application December 9, 1930, Serial No. 501,006

5 Claims. (Cl. 301—6)

This invention relates to wheels for motor vehicles and particularly to an all-metal artillery wheel assembly in which the nave member and wheel spider are preferably of cast metal, and the primary object in view is to provide a wheel of this type which is of open, self-ventilating construction and relatively light in weight, yet at the same time is strong and rugged and presents an unusually neat and attractive appearance, the various parts of the wheel being adapted for ease in manufacture and assembly.

The foregoing and other objects and advantages will become apparent in view of the following description taken in conjunction with the drawings, wherein:—

Figure 1:
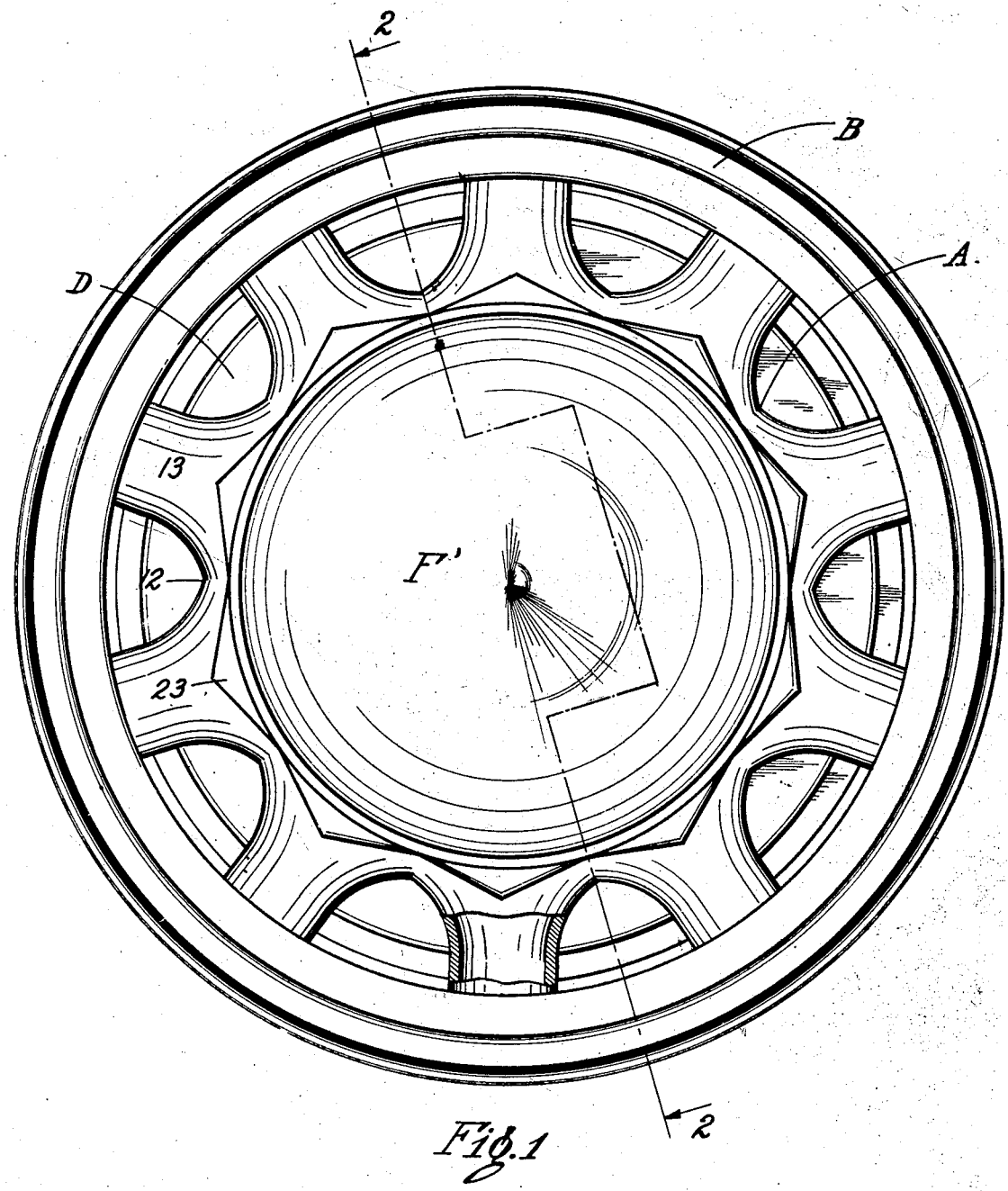
Figure 2:
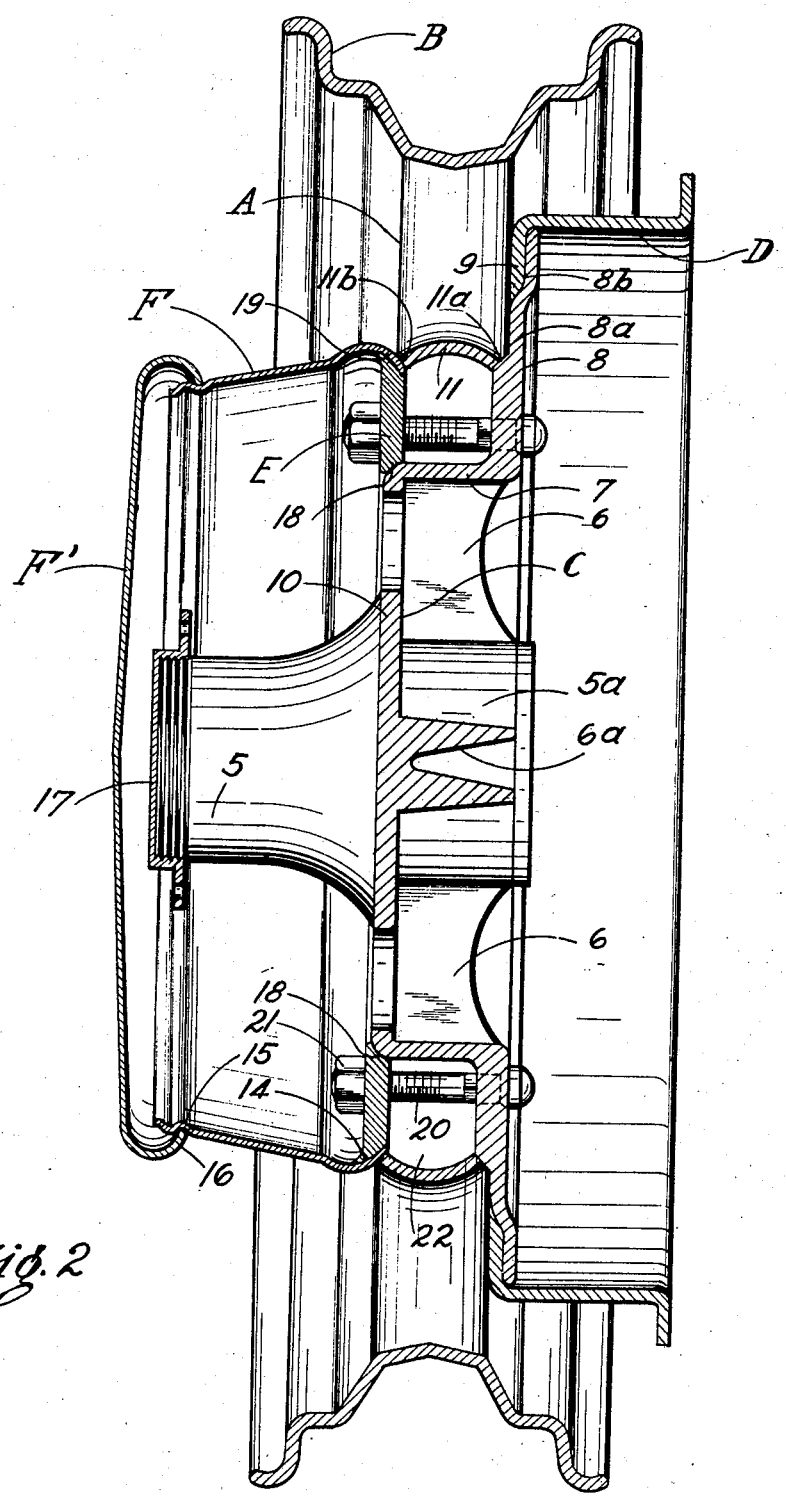

Fig. 1 is a view in outboard side elevation of a wheel embodying the features of the invention, and Fig. 2 is a view in radial cross section taken substantially on the line 2—2, Fig. 1.

The wheel assembly comprises an artillery type spider member generally designated at A, a tire rim B, a nave member C, a brake contacting member D, a clamp member or ring E, and a shell assembly F and F'.

The nave member is preferably of integral cast construction and comprises a transversely extended hub barrel 5 which has projecting radially therefrom in spider formation a series of ribs 6. These ribs 6 preferably extend for substantially the full width of the inboard portion 5a of the hub barrel to transversely reinforce the nave member, said ribs being of open channel construction as indicated at 6a to lighten the nave member and facilitate casting without sacrificing strength. At their outer extremities the ribs 6 merge with a transversely extended annular wall 7 which extends inwardly for the full width of the ribs and at its inboard side is formed with a radially extended flange 8. This flange 8 is preferably formed with a thickened portion which forms a support for the spider member A and terminates in a beveled shoulder 8a, on which the inboard side of said member rests. Radially beyond said shoulder 8a said flange is offset transversely, providing another shoulder 8b, and the brake contacting member D is formed with a web 9 which is contoured to fit between the spider member A and the peripheral portion of the flange 8 and mate with said shoulder. The ribs 6 are not only reinforced transversely, but are also reinforced circumferentially by fillets 10. It will be seen that the central portion of the nave member is of open construction while at the same time the ribs 6, wall 7 and flange 8 cooperate to provide a transversely and circumferentially reinforced member which is particularly well adapted to stand side stresses and strains and torque thrusts. The brake contacting member may be made of hard wear-resisting material, and due to the particular construction of the nave member A with its radially extending flange 8 which constitutes the major portion of the brake drum web, said member embodies a minimum amount of metal and therefore the cost of manufacture is reduced.

The spider member is preferably of the cast metal type which simulates in appearance an artillery wheel. This member is formed with a central wall 11 which is beveled on opposite sides as at 11a and 11b in order to adapt it to seat on the beveled shoulder 8a of the flange 8 at its inboard side, and at its outboard side to receive the clamp ring E with the edge of the shell F therebetween. The periphery of the wall 11 is arched as at 12 and between said arched portions the wall is extended radially defining relatively short, hollow spokes 13.

Part F of the shell assembly is preferably of band shape and has an inturned edge portion 14. At its outer edge said shell is formed with an inrolled bead defining an annular groove or recess 15. The part F' of the shell assembly constitutes a cap which is provided with a peripheral inturned bead or edge portion 16 which is adapted to have a snap engagement with the groove 15 of the shell F. This shell assembly may be formed of sheet metal and chrome-plated or otherwise given an attractive appearance. Due to the band shape formation of the part F of the assembly, said part may be rolled into shape and joined by welding to thereby obviate the waste of material which results from stamping of such parts. The cap F' as here shown does not constitute the hub cap for the hub barrel 5, a separate grease retainer member 17 being provided for this purpose.

To assemble the parts, the brake-contacting member D is positioned on the shoulder portion 8b of the flange 8 and may be secured to the peripheral portion of said flange. The spider member A is then positioned on the shoulder 8a of the flange 8 against the radial wall provided by the radially-extending portion of said flange and the mated web 7 of the brake-contacting member D. The shell F is then positioned against the outboard taper 11b of the spider member A and the clamp ring E placed in position with its radially inner edge 18 seated on the rounded peripheral edge of the wall 7 and its radially outer tapered edge 19 in contact with the inturned edge of the shell F and in clamping engagement with the said spider. The parts are then locked in position by the bolts 20, which have their headed ends seated in the thickened portion of the flange 8 and their outer ends passed through the clamp ring E and locked by nuts 21. It will be noted that a chamber 22 is formed between the spider member, flange 8, wall 7 and ring E, and the hollow spokes open into this chamber. This construction tends to dissipate heat generated by road friction and the braking action. To complete the assembly the cap F' is snapped into position on the end of the shell F. When this cap is in place, the entire central nave area of the wheel is formed with a hollow chamber which, in conjunction with the chamber 22, tends to effectively ventilate the wheel and dissipate heat while in service on the road. To gain access to the central nave area of the wheel, it is only necessary to remove the cap F'. The rim B is preferably of the drop-center type and may be shrunk or otherwise secured on the ends of the spokes 13.

It will be noted from the foregoing that I have provided a metal wheel assembly embodying parts which may be readily manufactured, are relatively light in weight and that the wheel as a whole is self-ventilating and attractive in appearance. The wheel may be configured by designs such as indicated at 23 to enhance the beauty thereof, and the arched lines together with the contour of the shell assembly provides an extremely attractive wheel which possesses the advantages of a cast metal wheel and which at the same time is not subject to the objections which have heretofore been encountered in the manufacture of such wheels.

Having thus described my invention, what I desire to secure by Letters Patent, is:

1. A metal wheel assembly for motor vehicles, comprising a nave member and a spoked spider member each adapted to be cast as a separate unit, and a brake contacting member; said nave member being in the form of a spider having a transversely extended central portion forming a hub, channeled ribs projecting radially from said hub and merging into a transverse wall which at its inner side merges into a radially extended flange which forms the web of the brake drum, the outer side of said flange being shouldered at spaced radial points to provide seats for said spoked spider member and said brake contacting member, said brake contacting member being formed with a web which is secured to said flange and the spoked spider member being seated on said flange, a clamp ring seated on the outer circumferential edge portion of said transverse wall and holding said spoked spider member in position on said flange, and a shell having its edge clamped between said ring and spider member and extending transversely outwardly around the hub and provided with a removable cap which shields the hub, nave member and clamping ring from exterior view.

2. A metal wheel assembly for motor vehicles comprising a nave member and a spoked spider member each adapted to be cast as a separate integral unit, and a brake contacting member; said nave member being in the form of a spider having a transversely-extended central portion forming a hub, ribs formed with hollow portions facing the inboard side of the wheel, said ribs being formed at their inner ends integrally with said hub and extending for substantially the full width thereof and at their outer ends merging with a transversely inwardly-extended wall which at its inboard side merges into a radially-extended flange and forming spaced openings in the wall between the hub and transverse wall, said flange being formed with a relatively heavy spider-supporting wall which is tapered annularly to provide a seat for said spider member and then inset to provide an engaging shoulder for said brake contacting member, said latter member having a web which is secured to said flange and is formed with a beveled edge which fits into said inset, and a clamp ring detachably secured to the spider-supporting wall of said flange and holding the spider member in assembled position on said shoulder, an annular ventilating chamber being formed between said ring and flange and said spokes being of hollow construction and opening into said chamber.

3. A metal wheel assembly for motor vehicles comprising a nave member and a spoked spider member, each adapted to be cast as a separate integral unit, a nave covering shell member, and a brake contacting member; said nave member being formed with a hub barrel, ribs formed integral with said barrel and projecting radially and merging with a transverse wall which extends inwardly for the full width of the ribs and at its inboard side is formed with a radially extended flange, said flange being formed with a relatively thick spider supporting wall which is beveled annularly to provide a seat for said spider member and then inset to provide an engaging shoulder for said brake contacting member, said latter member having a web which is secured to said flange and is formed with a beveled edge which fits into said inset, said shell being in the form of a band having an inturned inner edge adapted to fit against the base of said spider member, and means for holding the parts in assembled position.

4. A metal wheel assembly for motor vehicles comprising a nave member and a spoked spider member, each adapted to be cast as a separate integral unit, a nave covering shell member, and a brake contacting member; said nave member being formed with a hub barrel, ribs formed integral with said barrel and projecting radially and merging with a transverse wall which extends inwardly for the full width of the ribs and at its inboard side is formed with a radially extended flange, said flange being formed with a relatively thick spider supporting wall which is beveled annularly to provide a seat for said spider member and then inset to provide an engaging shoulder for said brake contacting member, said latter member having a web which is secured to said flange and is formed with a beveled edge which fits into said inset, said shell being in the form of a band having an inturned inner edge adapted to fit against the base of said spider member, and a clamping ring detachably secured against said inturned inner edge of the shell and supported by the transverse wall of the nave member to support the spider member in position on the seat of the radial flange of the nave member.

5. A metal wheel assembly for a motor vehicle comprising a nave member formed with a transversely extended hub barrel having ribs projecting radially therefrom in spider formation and merging with a transversely extended wall, said ribs being of such length as to provide a nave area of open construction which occupies a relatively large portion of the wheel diameter, said wall at its inboard side being merged with a radially extended spider mounting flange, a spider member having relatively short artillery type spokes seated on said flange in radially spaced relation to said wall, a clamping ring adapted to engage the outboard side of said spider member and clamp the latter against said flange, said ring and flange being formed with converging wedge shaped seats for said spider member, and a shell member having its edge portion engaged between the clamping ring and spider and extending outwardly around the entire open nave area of the wheel.

PHILIP M. MILLER.